United States Patent
Zhang et al.

(10) Patent No.: US 9,220,073 B2
(45) Date of Patent: Dec. 22, 2015

(54) METHOD, DEVICE AND SYSTEM FOR CONTROLLING UPLINK CHANNEL POWER

(71) Applicant: Huawei Technologies Co., Ltd., Shenzhen, Guangdong (CN)

(72) Inventors: Xingwei Zhang, Shenzhen (CN); Yuhua Chen, Shenzhen (CN); Junren Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 28 days.

(21) Appl. No.: 14/324,649

(22) Filed: Jul. 7, 2014

(65) Prior Publication Data

US 2014/0321389 A1 Oct. 30, 2014

Related U.S. Application Data

(63) Continuation of application No. PCT/CN2012/086640, filed on Dec. 14, 2012.

(30) Foreign Application Priority Data

Jan. 9, 2012 (CN) .......................... 2012 1 0004869

(51) Int. Cl.
*H04W 52/28* (2009.01)
*H04W 74/08* (2009.01)
(Continued)

(52) U.S. Cl.
CPC ............ *H04W 52/28* (2013.01); *H04W 52/281* (2013.01); *H04W 52/346* (2013.01);
(Continued)

(58) Field of Classification Search
CPC ... H04W 52/34; H04W 52/28; H04W 52/146; H04W 52/281; H04W 52/50; H04W 52/54; H04W 52/346; H04W 52/325; H04W 52/367; H04W 52/327; H04W 76/046; H04B 7/12

USPC .......................................................... 370/329
See application file for complete search history.

(56) References Cited

U.S. PATENT DOCUMENTS

2008/0214225 A1* 9/2008 Choukroun ........... H04W 52/40 455/522
2010/0074204 A1* 3/2010 Meylan ................. H04L 1/1822 370/329

(Continued)

FOREIGN PATENT DOCUMENTS

CN   101686560 A   3/2010
CN   101883437 A   11/2010

(Continued)

OTHER PUBLICATIONS

"Discussion on RACH collide with other UL transmission," 3GPP TSG-RAN WG2 Meeting #76, San Francisco, U.S., R2-115755, $3^{rd}$ Generation Partnership Project, Valbonne, France (Nov. 14-18, 2011).

(Continued)

*Primary Examiner* — Afsar M Qureshi
(74) *Attorney, Agent, or Firm* — Leydig, Voit & Mayer, Ltd.

(57) ABSTRACT

A sending parameter of a preamble is compared with at least one preset parameter threshold to obtain a comparison result. A channel priority is determined in accordance with the comparison result. When a plurality of uplink channels are required for simultaneous transmission, the transmitting powers of the plurality of uplink channels is determined in accordance with the channel priority; and the plurality of uplink channels comprising a PRACH. This scheme adopts an unfixed strategy for the ranking of the PRACH in the channel priority, and determines the ranking of the PRACH in the channel priority by comparing the sending parameter of the preamble with a preset parameter threshold or receiving a signaling from a base station.

18 Claims, 8 Drawing Sheets receive a signaling transmitted from a base station, where the signaling is used for informing a UE of a channel priority preset by the base station, and the channel priority comprises a ranking of a PRACH in the channel priority — S901 determine transmission powers for multiple uplink channels according to the channel priority, in the case where the multiple uplink channels are transmitted simultaneously, where the multiple uplink channels comprise the PRACH — S902

(51) Int. Cl.
*H04W 52/34* (2009.01)
*H04W 52/14* (2009.01)
*H04W 52/32* (2009.01)
*H04W 52/36* (2009.01)
*H04W 52/50* (2009.01)

(52) U.S. Cl.
CPC ........ *H04W74/0841* (2013.01); *H04W 52/146* (2013.01); *H04W 52/325* (2013.01); *H04W 52/367* (2013.01); *H04W 52/50* (2013.01)

(56) References Cited

U.S. PATENT DOCUMENTS

| | | | | |
|---|---|---|---|---|
| 2010/0177672 | A1* | 7/2010 | Dayal | H04W 52/46 370/311 |
| 2010/0322227 | A1* | 12/2010 | Luo | H04B 7/024 370/345 |
| 2011/0274022 | A1* | 11/2011 | Chen | H04W 52/42 370/311 |
| 2012/0069788 | A1 | 3/2012 | Shen et al. | |

FOREIGN PATENT DOCUMENTS

| | | | |
|---|---|---|---|
| CN | 102238716 A | 11/2011 | |
| WO | WO 2011040858 A1 | 4/2011 | |
| WO | WO2011040858 A1 * | 4/2011 | ............... H04B 7/12 |
| WO | WO2011120716 A1 * | 10/2011 | ............ H04W 52/14 |
| WO | WO 2011120716 A1 | 10/2011 | |

OTHER PUBLICATIONS

"Simultaneous transmissions of RACH and PUCCH/PUSCH/SRS," 3GPP TSG-RAN WG2 #76, San Francisco, U.S., R2 116184, 3$^{rd}$ Generation Partnership Project, Valbonne, France (Nov. 14-18, 2011).

* cited by examiner

METHOD, DEVICE AND SYSTEM FOR CONTROLLING UPLINK CHANNEL POWER

CROSS-REFERENCE TO RELATED APPLICATIONS

This application is a continuation of International Patent Application No. PCT/CN2012/086640, filed on Dec. 14, 2012, which claims priority to Chinese patent application No. 201210004869.4, filed on Jan. 9, 2012, both of which are hereby incorporated by reference in their entireties.

TECHNICAL FIELD

The present invention generally relates to the field of communication, and in particular to a method, device and system for controlling power of an uplink channel.

BACKGROUND

The long term evolution-advanced (LTE-A) Rel-10/11 technology of the 3$^{rd}$ generation partnership project (3GPP) is the enhanced LTE Rel-8 technology, which has a higher requirement on bandwidth than the LTE system and supports a peak data rate up to 1G. In order to meet the requirement for the bandwidth, the technique of component aggregation (CA) is adopted in the LTE-A system for expanding the bandwidth of the system. Moreover, various technologies of enhanced multiple-input multiple-output (MIMO) and the self-adaptive technologies are adopted in the LTE-A system to improve the data rate and the system performance.

In the above case, user equipment (UE) can support up to five component carriers. Generally, uplink channels in the LTE system include a physical uplink control channel (PUCCH), a physical uplink shared channel (PUSCH), a sounding reference signal (SRS) and a physical random access channel (PRACH). The channels may often be transmitted simultaneously. Therefore, the transmit power of the UE is prone to exceed the maximum transmit power of the UE, leading to power limitation, or the transmit power of the UE is prone to reach the interference level, leading to interference limitation. The following solutions are proposed for several different cases of the above problem.

1. PUCCH and PUSCH are transmitted simultaneously. The PUCCH can only be transmitted with a primary uplink carrier and the PUSCH can only be transmitted with a secondary uplink carrier. Therefore, in the case where the PUCCH and the PUSCH are transmitted simultaneously, a power zoom mechanism may be used. According to the power zoom mechanism, in the LTE-A Rel-10 system, the PUCCH is defined to have the highest priority, the PUSCH carrying uplink control information (UCI) is defined to have the middle priority and the PUSCH carrying only data is defined to have the lowest priority. In accordance with the above-mentioned order of priority, if there is still some power remained in the case where the transmit power for the channel with a highest priority is ensured, the remained power may be assigned to a channel with a second highest priority. Moreover, if the priorities for all the channels are the same, the transmit power for all the channels are decreased to scale and then the maximum transmit power are shared equally by all the channels 2. SRS and PUCCH are transmitted simultaneously. If a shortened PUCCH format is used in the PUCCH, the SRS is transmitted in the last symbol of the sub-frame (in the case where the sub-frame includes 14 symbols of normal cyclic prefix (NCP) or 12 symbols of extended cyclic prefix (ECP)). If the shortened PUCCH format is not used in the PUCCH, the SRS is discarded.

3. SRS and PUSCH are transmitted simultaneously. If the SRS and the PUSCH are transmitted with the same carrier, rate matching is performed on the PUSCH in accordance with 13 symbols (NCP) or 11 symbols (ECP) to empty out the last symbol to transmit the SRS. If the SRS and the PUSCH are transmitted with different carriers, the SRS is discarded.

4. PRACH and the above-mentioned channels are transmitted simultaneously. In the LTE-A Rel-10 system, it is impossible to transmit PRACH and other channel simultaneously, since the UE can only support the PRACH in a primary cell where the primary carrier locates. However, in the LTE-A Rel-11 system, different carriers are allowed to have different timing advance (TA) values and are classified into different timing advance groups (TAGs) according to the TA values, with the TA values of the carriers in each TAG being the same. The TA value of a TAG including a primary cell (PCell) takes the TA value of the PCell as reference. A TAG including only the secondary cells (SCells) may take the TA value of one of the SCells as reference. To obtain the TA value in the SCell, the system allows the PRACH to be existed in the SCell, for transmitting the RACH preamble to the UE. In the above case, there may be a problem that the PRACH in the SCell may be transmitted simultaneously in a same sub-frame with the PUCCH, the PUSCH and the SRS in the PCell or the PUSCH and SRS in other SCell. As shown in FIG. 1, in this case, the transmit power of the UE may exceed the maximum transmit power of the UE, leading to power limitation, or the transmit power of the UE may reach the interference level, leading to interference limitation.

SUMMARY

The object of the embodiments of the invention is to provide a method for power control of an uplink channel, so as to solve the problem that the transmit power of a UE is prone to exceed the maximum transmit power of the UE, leading to power limitation, or the transmit power of the UE is prone to reach the interference level, leading to interference limitation, in the case where the PRACH in the SCell and other channel are transmitted simultaneously in a same sub-frame.

The embodiments of the invention may be implemented as follows. A method for power control of an uplink channel includes:

comparing a transmission parameter for a preamble with at least one preset parameter threshold to obtain a comparison result, and determining a channel priority according to the comparison result, where the channel priority includes a ranking of a physical random access channel (PRACH) in channel priorities; and controlling transmit power for multiple uplink channels according to the channel priority, in a case where the multiple uplink channels need to be transmitted simultaneously.

Another object of the embodiments of the invention is to provide an apparatus for power control of an uplink channel, including:

a channel priority determining module, configured to compare a transmission parameter for a preamble with at least one preset parameter threshold to obtain a comparison result, and determine a channel priority according to the comparison result, where the channel priority includes a ranking of a PRACH in channel priorities; and a first power controlling module, configured to control transmit powers for multiple uplink channels according to the channel priority, in a case where the multiple uplink channels need to be transmitted simultaneously, where the multiple uplink channels include the PRACH.

In the embodiments of the invention, the ranking of the PRACH in the channel priorities is not fixed. The transmission parameter for the preamble is compared with the preset parameter threshold and the channel priority is determined. The transmit power of an uplink channel is controlled according to the channel priority. Thereby, it is avoided that the transmit power of the UE exceeds the maximum transmit power of the UE or reaches the interference level in the case where the PRACH is transmitted in the SCell. Moreover, the power limitation and the interference limitation may be avoided.

Another object of the embodiments of the invention is to provide a method for power control of an uplink channel, including:

receiving signaling transmitted from a base station, where the signaling is used for informing a UE of a channel priority preset by the base station, and the channel priority includes a ranking of a PRACH in channel priorities; and controlling transmit power for multiple uplink channels according to the channel priority, in a case where the multiple uplink channels need to be transmitted simultaneously, where the multiple uplink channels include the PRACH.

Another object of the embodiments of the invention is to provide an apparatus for power control of an uplink channel, including:

the apparatus for power control of an uplink channel, including:

a signaling receiving module, configured to receive signaling transmitted from a base station, wherein the signaling is used for informing a UE of a channel priority preset by the base station, and the channel priority includes a ranking of a PRACH in channel priorities; and a second power controlling module, configured to control transmit power for multiple uplink channels according to the channel priority, in a case where the multiple uplink channels need to be transmitted simultaneously, where the multiple uplink channels include the PRACH.

In the embodiments of the invention, the channel priority preset by the base station is acquired by using singling, the ranking of the PRACH in the channel priorities is determined, and the transmit power of an uplink channel is controlled according to the channel priority. Thereby, it is avoided that the transmit power of the UE exceeds the maximum transmit power of the UE or reaches the interference level in the case where the PRACH is transmitted in the SCell. Moreover, the power limitation and the interference limitation may be avoided.

DETAILED DESCRIPTION

To make the above object, technical solution and advantages of the invention more obvious and easy to be understood, the invention is further described in detail in conjunction with the drawings and the embodiments in the following. It should be understood that the embodiments described herein are only for explaining rather than limiting the invention.

In the embodiments of the invention, a priority of a PRACH is not fixed. Transmit power for the UE to transmit a preamble is compared with a preset power threshold. A rank of the PRACH in channel priorities is determined according to the comparison result. Thereby, the transmit power of an uplink channel is controlled. Therefore, it is avoided that the transmit power of the UE exceeds the maximum transmit power of the UE or reaches the interference level in the case where the PRACH is transmitted in a SCell. Moreover, the power limitation and the interference limitation may be avoided.

Figure 1:
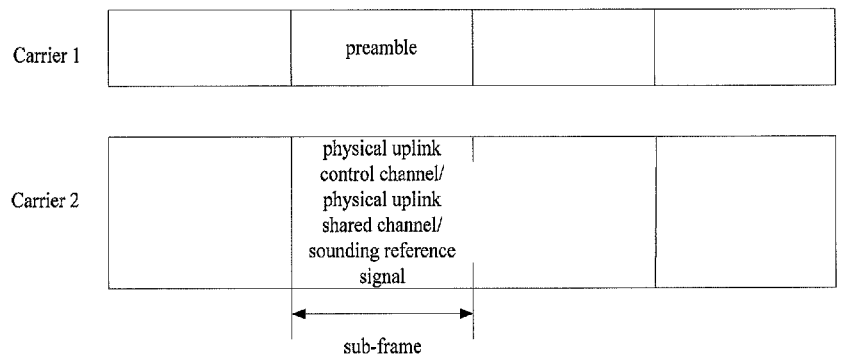
FIG. 1 is a diagram showing principle for a case where PRACH channel and other uplink channel are simultaneously transmitted in a same sub-frame in the prior art.
Figure 2:
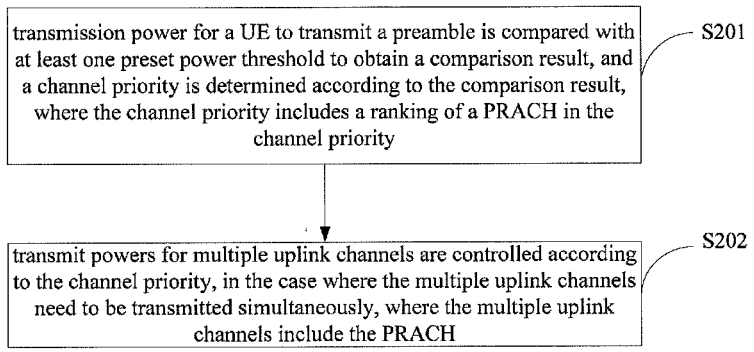
FIG. 2 is a flow chart of a method for power control of an uplink channel according to a first embodiment of the invention.

FIG. 2 shows a flow chart of a method for power control of an uplink channel according to a first embodiment of the invention, which is described in detail as follows.

In Step S201, transmit power for a UE to transmit a preamble is compared with at least one preset power threshold to obtain a comparison result, and a channel priority is determined according to the comparison result, where the channel priority includes a ranking of a PRACH in channel priorities.

In this embodiment, the preset power threshold is used for weighing the magnitude of the transmit power for the UE to transmit the preamble. The number of the preset power threshold may be one or more. As for different number of the preset power thresholds, the way for comparing the transmit power with the power threshold is correspondingly different in Step S201, which is described in detail in the following second and third embodiments and is not be described herein.

In this embodiment, the power threshold may be acquired in three ways. Firstly, the power threshold may be preset according to a corresponding standard, and the UE may directly acquire the preset power threshold. Alternatively, the power threshold may be determined by a base station, and the UE may acquire the power threshold via signaling transmitted from the base station. Alternatively, the power threshold may be determined by the UE. In this embodiment, the way for acquiring the threshold is not limited thereto. Moreover, a times threshold in the following embodiments of the present invention may also be acquired in the three ways, which is not be described in the following embodiments any more.

The power control for the PRACH is implemented by using a ramping mechanism. That is to say, if the current transmission of the preamble fails, the transmit power for the next transmission of the preamble is increased by one step on the current transmit power; if the next transmission fails again, the transmit power is continuously to be increased by one step, until the transmission of the preamble is successful. According to the above mechanism, in the case where the channel priority of the PRACH is always defined to be the lowest, the transmission of the other channel may be ensured, but the transmission of the PRACH may be delayed due to a too small transmit power for the PRACH. Moreover, the next transmission of the preamble may collide with other channel In the case where the priority of the PRACH is always set to be the highest, the probability of the success in the current transmission of the preamble may be increased, but the transmission of other channel is affected, leading to deteriorated transmission performance of the uplink channel Therefore, in this embodiment, the priority of the PRACH is not fixed. The transmit power for the preamble is compared with the preset power threshold, to determine the ranking of the PRACH in the channel priorities. The channel priorities herein include a first channel priority for the case where the PRACH and the PUCCH/PUSCH are transmitted simultaneously and a second channel priority for the case where the PRACH and the SRS are transmitted simultaneously.

As for the priorities set in the LTE-A Rel-10 system, the PUCCH is set to have the highest priority, the PUSCH carrying the UCI is defined to have the middle priority and the PUSCH carrying only transmission data and carrying no UCI is set to have the lowest priority. In accordance with the above-mentioned definition of the priority, there may be the following kinds of orderings of the channel priority, based on different rankings of the PRACH in the channel priorities.

(A) In the case where the PRACH and the PUCCH or PUSCH are transmitted simultaneously:
  First Priority: PRACH>PUCCH>UCI on PUSCH>PUSCH;
  Second Priority: PUCCH>PRACH>UCI on PUSCH>PUSCH;
  Third Priority: PUCCH>UCI on PUSCH>PRACH>PUSCH;
  Fourth Priority: PUCCH>UCI on PUSCH>PUSCH>PRACH.

The UCI on PUSCH denotes the PUSCH carrying the UCI, and the PUSCH denotes the PUSCH carrying only transmission data.

(B) In the case where the PRACH and the SRS are transmitted simultaneously:
  Fifth Priority: PRACH>a-SRS>p-SRS;
  Sixth Priority: a-SRS>PRACH>p-SRS;
  Seventh Priority: a-SRS>p-SRS>PRACH.

The a-SRS denotes an aperiodic SRS, and the p-SRS denotes a periodic SRS.

In Step S202, transmit powers for multiple uplink channels are controlled according to the channel priority, in the case where the multiple uplink channels need to be transmitted simultaneously, where the multiple uplink channels include the PRACH.

It should be noted that, in the embodiment of the invention, in order to ensure backward compatibility of the system to ensure that the LTE terminal is accessible by the LTE-A system, in the case where the channel priority is determined, the power control is performed based on the power zoom mechanism mentioned in the background in the case where the PRACH and other channel are transmitted simultaneously in one sub-frame, and the power control is performed still based on the ramping mechanism for the PRACH channel in multiple sub-frames.

Specifically, in the case where the PRACH and other channel are transmitted simultaneously in one sub-frame, there is no need to perform Step S202 if the currently available transmit power of the UE is enough for simultaneously transmitting the multiple uplink channels, i.e. the transmit power control dose not have to be performed on the uplink channels If the currently available transmit power of the UE is not enough for simultaneously transmitting the multiple uplink channels, the available transmit power is preferably used for an uplink channel with the highest ranking in the channel priorities based on the power zoom mechanism. If there is still some power remained, the remained power may be assigned to a channel with a second highest ranking in the channel priorities, and so on. The above-mentioned methods for controlling the power are applicable for all the embodiments of the invention to control powers for multiple uplink channels The relevant step in the following embodiments is not described.

In this embodiment, according to the above-mentioned steps, a corresponding channel priority may be flexibly determined according to the transmit power for the UE to transmit the preamble. Moreover, the transmit power for each uplink channel may be controlled according to the determined channel priority by following the power zoom mechanism and the ramping mechanism. Thereby, it is avoided that the transmit power of the UE may exceed the maximum transmit power of the UE or may reach the interference level when the PRACH in the Scell and other channel are transmitted in the same sub-frame.

Figure 3:
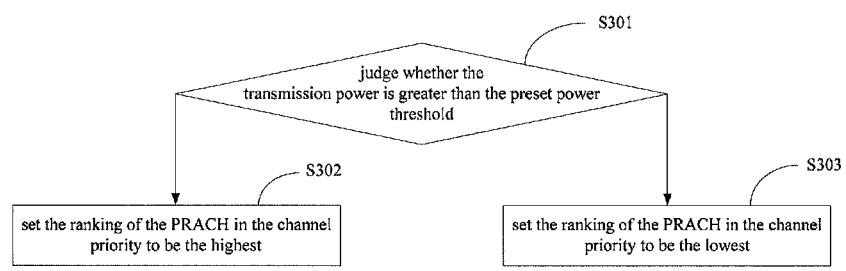
FIG. 3 is a flow chart of a method for power control of an uplink channel according to a second embodiment of the invention.

FIG. 3 shows a flow chart of a method for power control of an uplink channel according to a second embodiment of the invention, which describes the specific process in Step S201 in the case where that there is one preset power threshold. The process is described in detail as follows.

In Step S301, it is judged whether the transmit power is greater than the power threshold, and Step S302 is performed if the transmit power is greater than the power threshold and Step S303 is performed if the transmit power is not greater than the power threshold.

In Step S302, the transmit power for the UE to transmit the preamble is greater than the preset power threshold. In this case, the system firstly ensures the transmit power for the PRACH. Since the transmit power for the PRACH is higher, the ranking of the PRACH in the channel priorities is set to be the highest. According to the ramping mechanism, the transmission of the preamble is completed in a short time without affecting the transmission of other channel.

In Step S303, the transmit power for the UE to transmit the preamble is not greater than the preset power threshold. In this case, the ranking of the PRACH in the channel priorities is set to be the lowest. In this case, since the transmit power for the PRACH is lower, the transmission of the preamble is completed in a longer time. Therefore, the transmission performance of other channel is not affected in the case where the PRACH has the lowest priority.

Figure 4:
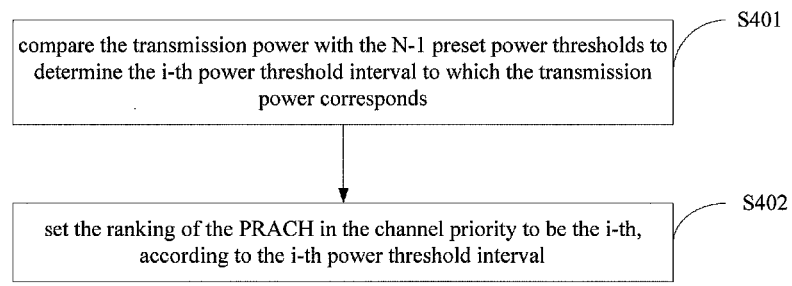
FIG. 4 is a flow chart of a method for power control of an uplink channel according to a third embodiment of the invention.

FIG. 4 shows a flow chart of a method for power control of an uplink channel according to a third embodiment of the invention, which describes the specific process in Step S201 in the case where there are multiple preset power thresholds. In this embodiment, there are N−1 power thresholds. N is an integer larger than or equal to 3. The N−1 power thresholds are ordered in a descending order to form N power threshold intervals. Each of the power threshold intervals is corresponding to one ranking of a PRACH in the channel priorities. The process is described in detail as follows.

In Step S401, the transmit power is compared with the N−1 preset power thresholds to determine an i-th power threshold interval to which the transmit power corresponds, where $1 \leq i \leq N$.

In Step S402, the ranking of the PRACH in the channel priorities is set to be the i-th, based on the i-th power threshold interval.

For example, in the case where the PRACH and the PUCCH or PUSCH are transmitted simultaneously in one sub-frame, there may be four possible corresponding channel priorities as described above. There may be four preset power thresholds, assuming the four preset power thresholds to be T1, T2, T3 and T4 in a descending order. If the transmit power for the UE to transmit the preamble is greater than the maximum power threshold T1, the ranking of the PRACH in the channel priorities is set to be the first priority, that is, the channel priority of the PRACH is set to be the highest, which is the case in First Priority mentioned above. If the transmit power for the UE to transmit the preamble is higher than T2 and lower than T1, the ranking of the PRACH in the channel priorities is set to be the second priority, which is the case in Second Priority mentioned above, and so on. If the transmit power for the UE to transmit the preamble is lower than T4, the ranking of the PRACH in the channel priorities is set to be the fourth priority, that is, the channel priority of the PRACH is set to be the highest, which is the case in Fourth priority mentioned above.

In this embodiment, it is possible to determine more accurately different channel priorities according to different transmit power by presetting multiple power thresholds, further improving the performance of the power control of the uplink channel Based on the above concept, a preset times of transmission is used instead of the preset power threshold in another embodiment of the present invention. The times the preamble is transmitted is compared with the preset times of transmission and the ranking of the PRACH in the channel priorities is determined according to the comparison result.

Figure 5:
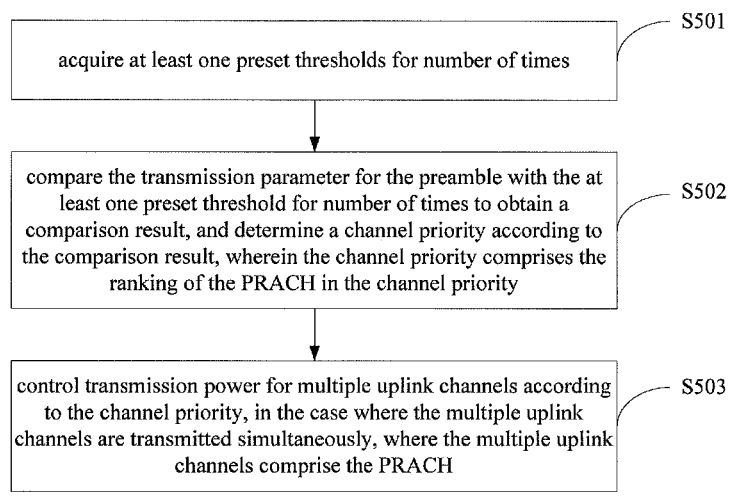
FIG. 5 is a flow chart of a method for power control of an uplink channel according to a fourth embodiment of the invention.

FIG. 5 shows a flow chart of a method for power control of an uplink channel according to a fourth embodiment of the invention. The process is described in detail as follows.

In Step S501, at least one preset times threshold is acquired.

According to the ramping mechanism, the transmission of the preamble may be completed after several times of transmission, in the case where the transmit power for the preamble is lower. Therefore, in this embodiment, the preset times threshold is used for determining the transmission of the preamble. There may be one or more preset times thresholds. As for different number of the preset times thresholds, the way for comparing the actual number of times of the transmission with the times threshold is correspondingly different in Step S502, which is described in detail in the following fifth and sixth embodiments and is not be described herein.

In Step S502, the transmit parameter for the preamble is compared with at least one preset times threshold to obtain a comparison result, and a channel priority is determined according to the comparison result, where the channel priority includes the ranking of the PRACH in the channel priorities. The transmit parameter includes but not limited to the times the preamble is transmitted, the times of collision between the PRACH and other channel or the times of occurrence of opportunity that the preamble is transmittable.

Figure 6:
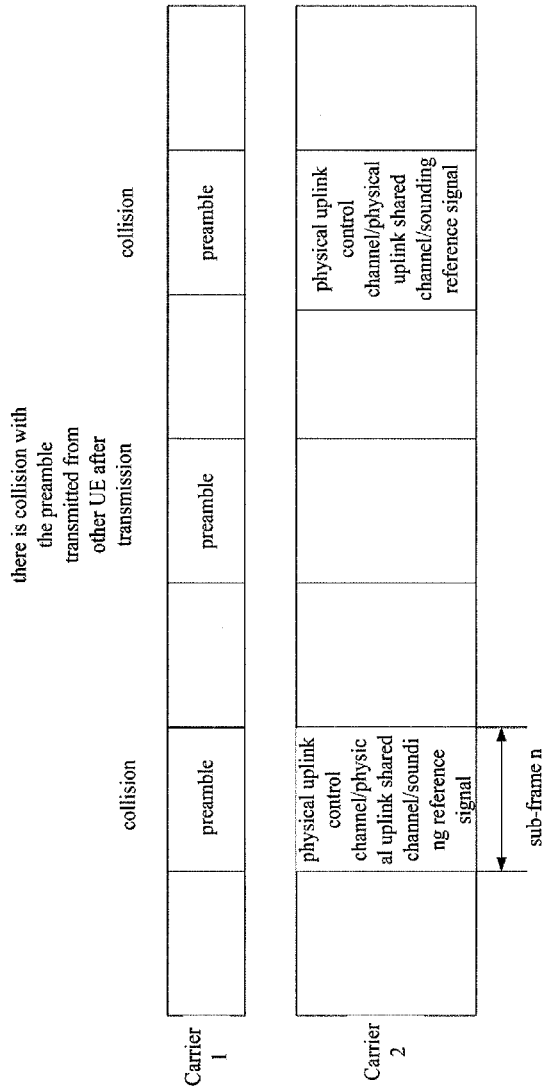
FIG. 6 is a schematic diagram of three times of transmission for a preamble according to the embodiment of the invention.

In the channel transmission, the transmit power may not be assigned to the preamble at all and it is possible that the preamble can not be transmitted, if the channel priority of the PRACH is always set to be the lowest. As shown in FIG. 6, in the three times of transmission of the preamble, the preamble is transmitted when the preamble transmission is performed for the second time. However, when the preamble transmission is performed for the second time, the preamble is collided with a preamble of other UE and the preamble is not transmitted successfully. In this case, the times of transmission for the preamble is 1, the times of collision between the PRACH and other channel is 2 and the times of occurrence of opportunity that the preamble is transmittable is 3. In the above-mentioned case, the preamble may have multiple opportunities to be transmitted however the corresponding transmission operations are not performed. The preamble may also be transmitted several times however the several times of transmission all fail due to collision. Therefore, in the present invention, the priority of the PRACH is not fixed. Instead, the ranking of the PRACH in the channel priorities is determined by comparing the preset times threshold with the current times the preamble is transmitted, the times of collision between the PRACH and other channel or the times of occurrence of opportunity that the preamble is transmittable.

In Step S503, transmit power for multiple uplink channels are controlled according to the channel priority, if the multiple uplink channels are transmitted simultaneously, where the multiple uplink channels include the PRACH.

In this embodiment, according to the above-mentioned steps, a corresponding channel priority may be flexibly determined according to the current corresponding times for the UE to transmit the preamble. Moreover, the transmit power for each uplink channel may be controlled according to the determined channel priority by following the power zoom mechanism and the ramping mechanism. Thereby, it is avoided that the transmit power of the UE may exceed the maximum transmit power of the UE or may reach the interference level when the PRACH in the Scell and other channel are transmitted in the same sub-frame. Moreover, the reasons for failure in transmission of the preamble are taken into account, thereby improving the success rate of the transmission of the access channel and improving the transmission performance of the system.

Figure 7:
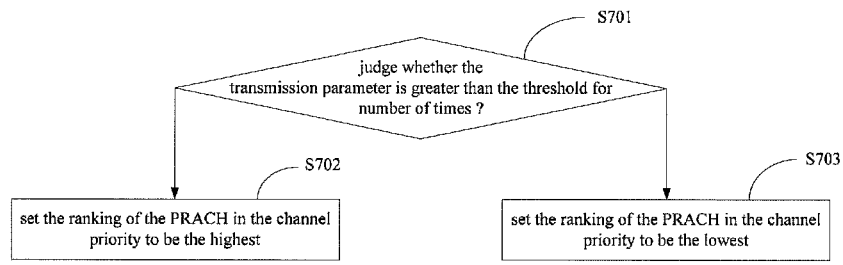
FIG. 7 is a flow chart of a method for power control of an uplink channel according to a fifth embodiment of the invention.

FIG. 7 shows a flow chart of a method for power control of an uplink channel according to a fifth embodiment of the invention, which describes the specific process in Step S502 in the case where that there is one preset times threshold. The process is described in detail as follows.

In Step S701, it is judged whether the transmit parameter is greater than the times threshold, and Step S702 is performed if the transmit parameter is greater than the times threshold and Step S703 is performed if the transmit parameter is not greater than the times threshold.

In Step S702, if the current times the preamble is transmitted, the times of collision between the PRACH and other channel or the times of occurrence of opportunity that the preamble is transmittable is greater than the preset times threshold, the ranking of the PRACH in the channel priorities is set to be the highest. In this case, the system firstly ensures the transmit power for the PRACH and the transmission of the preamble is completed in a short time.

In Step S703, if the current times the preamble is transmitted, the times of collision between the PRACH and other channel or the times of occurrence of opportunity that the preamble is transmittable is not greater than the preset times threshold, the ranking of the PRACH in the channel priorities is set to be the lowest. In this case, the transmission is performed by following the ramping mechanism. If the current times the preamble is transmitted or the current times of occurrence of opportunity that the preamble is transmittable is greater than the preset times threshold, the ranking of the PRACH in the channel priorities may be set to be the highest.

By the above-mentioned steps, the case that the transmission of the preamble is still not successful after multiple times of transmission does not occur any more, thereby improving the transmission performance of the system.

Figure 8:
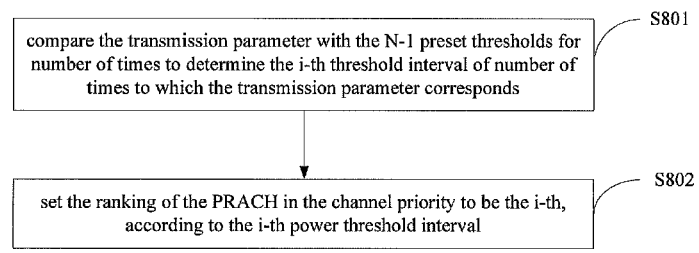
FIG. 8 is a flow chart of a method for power control of an uplink channel according to a sixth embodiment of the invention.

FIG. 8 shows a flow chart of a method for power control of an uplink channel according to a sixth embodiment of the invention, which describes the specific process in Step S502 in the case where there are multiple preset times thresholds. In this embodiment, there are N−1 preset parameter thresholds. N is an integer larger than or equal to 3. The N−1 parameter thresholds are ordered in a descending order to form N parameter threshold intervals. Each of the parameter threshold intervals is corresponding to one ranking of a PRACH in the channel priorities. The process is described in detail as follows.

In Step S801, the transmission parameter is compared with the N−1 parameter preset times thresholds to determine the i threshold interval of times to which the times the preamble is transmitted, the times of collision between the PRACH and other channel, or the times of occurrence of opportunity that the preamble is transmittable corresponds, where 1≤i≤N.

In Step S802, the ranking of the PRACH in the channel priorities is set to be the i-th, according to the i-th interval of the times threshold.

For example, the preamble may be allowed to collide once with other channel, i.e., the channel priority of the PRACH may be increased by one level, by setting a corresponding times threshold. In this embodiment, it is possible to determine more accurately the channel priority of the PRACH according to the current transmission of the preamble by presetting the multiple times thresholds, further improving the transmission performance of the system and the power control performance of the uplink channel In the first to sixth embodiments of the present invention, the current transmit power for the preamble, the times the preamble is transmitted, the times of collision between the PRACH and other channel or the times of occurrence of opportunity that the preamble is transmittable is compared with the corresponding parameter threshold (including the power threshold or the times threshold). Then, the ranking of the PRACH in the corresponding channel priorities is determined according to the comparison result. It should be noted that, as described in the background, during the actual channel transmission, the PUCCH/PUSCH and the SRS are not possible to be transmitted simultaneously. However, it is possible that the PRACH and the PUCCH/PUSCH are transmitted simultaneously and the PRACH and the SRS are transmitted simultaneously. Correspondingly, the first channel priority and the second channel priority are obtained respectively for the two kinds of simultaneous transmission mentioned above. For the two channel priorities mentioned above, the power control may be performed by using the same set of preset parameter thresholds, or may be performed by using two different and individual sets of preset parameter thresholds respectively. In the case where the control is performed by using the same set of preset parameter thresholds and the set of parameter thresholds has multiple parameter thresholds, the ranking has to be determined by using three parameter thresholds, since the first channel priority has four kinds of ordering sequences. However, the ranking may be determined by using two parameter thresholds, since the second channel priority has three kinds of ordering sequences. Therefore, during determination for the second channel priority, the channel priority may be determined by using any two of the three parameter thresholds. In implement, the case where only one set of preset parameter thresholds is used for determining the two kinds of the channel priorities may save system resources.

Figure 9:
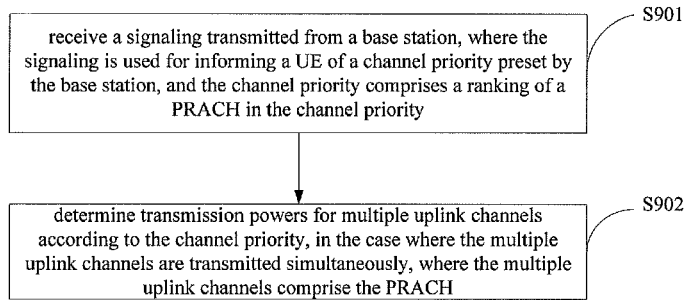
FIG. 9 is a flow chart of a method for power control of an uplink channel according to a seventh embodiment of the invention.

FIG. 9 shows a flow chart of a method for power control of an uplink channel according to a seventh embodiment of the invention. In this embodiment, the channel priority is also not fixed. The channel priority is preset by a base station and a UE is informed of which kind of channel priority is to be used via signaling. The process is described in detail as follows.

In Step S901, signaling transmitted from the base station is received, where the signaling is used for informing a UE of a channel priority preset by the base station, and the channel priority includes a ranking of a PRACH in channel priorities.

In this embodiment, the following aspects about the ranking of the PRACH in the channel priority may be taken into consideration in the case where the base station presets the channel priority.

1. The highest channel priority is set for a non-competitive PRACH.

2. In the case where the preamble is transmitted in multiple sub-frames and the collided sub-frame is not the first sub-frame of the preamble, a higher channel priority should be set for the PRACH, since the transmit power for the preamble is determined in the first sub-frame, and the subsequent sub-frame should be consistent with the first sub-frame. In the case where the preamble is transmitted in multiple sub-frames and the collided sub-frame is the first sub-frame of the preamble, a lower channel priority should be set for the PRACH.

3. As for the case other than the above-mentioned aspects 1 and 2, since there is already the power limitation or interference limitation and it is not suitable to add a converged carrier to the UE, the lowest channel priority is set for the PRACH.

In practice, the configuration for the channel priority of the base station may be determined as required, which is not limited herein.

In Step S902, transmit powers for multiple uplink channels are controlled according to the channel priority, if the multiple uplink channels are transmitted simultaneously, where the multiple uplink channels include the PRACH.

In this embodiment, the channel priority to be used is identified by code in the signaling transmitted from the base station. For example, 2-bit data may be used to identify different channel priorities.

(A) In the case where the PRACH and the PUCCH or PUSCH are transmitted simultaneously:
 00: PRACH>PUCCH>UCI on PUSCH>PUSCH;
 01: PUCCH>PRACH>UCI on PUSCH>PUSCH;
 10: PUCCH>UCI on PUSCH>PRACH>PUSCH;
 11: PUCCH>UCI on PUSCH>PUSCH>PRACH.

(B) In the case where the PRACH and the SRS are transmitted simultaneously:
 00: PRACH>a-SRS>p-SRS;
 01: a-SRS>PRACH>p-SRS;
 10: a-SRS>p-SRS>PRACH.

According to an embodiment of the present invention, in the above two cases, the same code in the signaling may be used to identify the ranking of the PRACH in the channel priorities. Alternatively, different codes in the signaling may be used to identify the ranking of the PRACH in the channel priorities.

According to another embodiment of the present invention, in the above two cases, joint code, for example 3-bit code, may be used to identify different channel priorities.

In the above implementations, the UE may determine the channel priority to be used, by acquiring the code in the signaling for identifying the channel priority and decoding the code by following a preset coding-encoding rule.

In this embodiment, by Steps S901 to S902, the channel priority may also be controlled flexibly and the problem of controlling power of an uplink channel may be well solved, thereby avoiding the power limitation or interference limitation.

Figure 10:
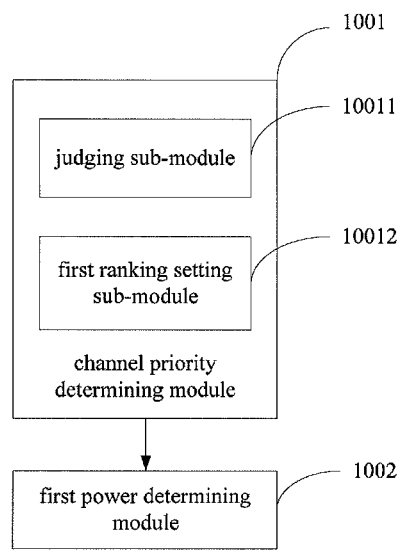
FIG. 10 is a structural block diagram of a device for power control of an uplink channel according to an eighth embodiment of the invention.

FIG. 10 shows the structure of an apparatus for power control of an uplink channel according to an eighth embodiment of the invention. For the ease of illustration, only relevant parts of the embodiment are shown.

As shown in FIG. 10, the apparatus may operate in a system such as LTE-A Rel-10/11. The apparatus includes:
- a channel priority determining module 1001, configured to compare a transmission parameter for a preamble with at least one preset parameter threshold to obtain a comparison result, and determine a channel priority according to the comparison result, where the channel priority includes a ranking of a PRACH in channel priorities; and
- a first power controlling module 1002, configured to control transmit power for multiple uplink channels according to the channel priority, in the case where the multiple uplink channels need to be transmitted simultaneously, where the multiple uplink channels include the PRACH. The first power controlling module preferably uses the available transmit power for an uplink channel with the highest ranking in the channel priority, according to the ranking of each of the uplink channels in the channel priorities.

In the case where there is one preset parameter threshold, the channel priority determining module 1001 includes:
- a judging sub-module 10011, configured to judge whether the transmission parameter is greater than the preset parameter threshold; and
- a first ranking setting sub-module 10012, configured to set the ranking of the PRACH in the channel priorities to be the highest if the transmission parameter is greater than the preset parameter threshold, and set the ranking of the PRACH in the channel priorities to be the lowest if the transmission parameter is not greater than the preset parameter threshold.

Figure 11:
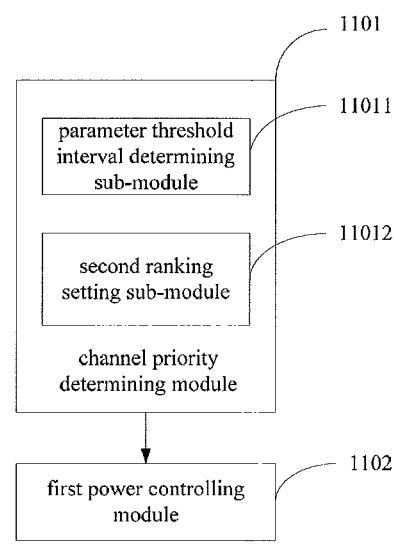
FIG. 11 is a structural block diagram of the device for power control of the uplink channel according to the eighth embodiment of the invention, in a case where there are multiple preset parameter thresholds.

As another embodiment of the invention, as shown in FIG. 11, in the case where that there are N−1 preset parameter thresholds, where N is an integer greater than or equal to 3 and the N−1 preset parameter thresholds form N parameter intervals, and the first channel priority determining module 1101 includes:
- a parameter threshold interval determining sub-module 11011, configured to compare the transmission parameter with the N−1 parameter thresholds and determine the i-th parameter threshold interval to which the transmission parameter corresponds, where 1≤i≤N; and
- a second ranking setting sub-module 11012, configured to set the ranking of the PRACH in the channel priorities to be the i-th, according to the i-th parameter threshold interval.

Figure 12:
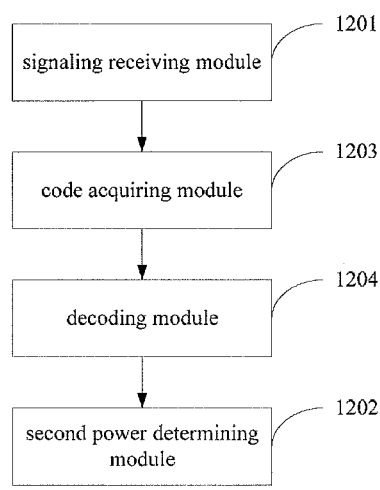
FIG. 12 is a structural block diagram of a device for power control of an uplink channel according to a ninth embodiment of the invention.

FIG. 12 shows the structure of an apparatus for power control of an uplink channel according to a ninth embodiment of the invention. For the ease of illustration, only relevant parts of the embodiment are shown.

As shown in FIG. 12, the apparatus may operate in a system such as LTE-A Rel-10/11. The apparatus includes:
- a signaling receiving module 1201, configured to receive signaling transmitted from a base station, where the signaling is used for informing a UE of a channel priority preset by the base station, and the channel priority includes a ranking of a PRACH in channel priorities; and
- a second power controlling module 1202, configured to control transmit power for multiple uplink channels according to the channel priority, in the case where the multiple uplink channels is transmitted simultaneously, where the multiple uplink channels include the PRACH.

The apparatus further includes:
- a code acquiring module 1203, configured to acquire code in the signaling, where the code is used for indicating the channel priority; and
- a decoding module 1204, configured to determine the channel priority according to the code by following a preset coding-decoding rule.

In the embodiments of the invention, the ranking of the PRACH in the channel priorities is not fixed. The transmission parameter for the UE to transmit the preamble is compared with the preset parameter threshold. Alternatively, the ranking of the PRACH in the channel priorities is determined according to the singling received from the base station. Thereby, the uplink channel transmit power is controlled. Therefore, it is avoided that the transmit power of the UE exceeds the maximum transmit power of the UE or reaches the interference level when the PRACH is transmitted in the SCell. Moreover, the power limitation and the interference limitation may be avoided.

What is described above is only the preferable embodiments of the invention and is not intended to define the invention. Any changes, equivalent substitution, improvement and so on made within the spirit and principle of the present invention are all contained in the scope of protection of the present invention.

What is claimed is:

1. A method for power control of an uplink channel, comprising:
   - comparing a transmission parameter for a preamble with at least one preset parameter threshold to obtain a comparison result;
   - determining a channel priority of a physical random access channel (PRACH) according to the comparison result, wherein the channel priority comprises a ranking of the PRACH in channel priorities; and
   - controlling transmit power for a plurality of uplink channels according to the channel priority, in a case where the plurality of uplink channels need to be transmitted simultaneously, wherein the plurality of uplink channels comprise the PRACH.

2. The method according to claim 1, wherein the transmission parameter is transmit power of the PRACH and the parameter threshold is a power threshold.

3. The method according to claim 1, wherein the transmission parameter is a number of times that the preamble is transmitted, a number of times of collision between the PRACH and at least one of other channels, or a number of times of occurrence of opportunity that the preamble is transmittable, and the parameter threshold is a times threshold.

4. The method according to claim 1, wherein:
   - the at least one preset parameter threshold is one parameter threshold; and
   - the comparing the transmission parameter for the preamble with the at least one preset parameter threshold to obtain the comparison result and determining the ranking of the PRACH in the channel priorities according to the comparison result comprises:
     - judging whether the transmission parameter is greater than the one parameter threshold; and in response to judging that the transmission parameter is greater than the parameter threshold, setting the ranking of the PRACH in the channel priorities to be the highest; and in response to judging that the transmission parameter is not greater than the parameter threshold, setting the ranking of the PRACH in the channel priorities to be the lowest.

5. The method according to claim 1, wherein
the at least one preset parameter threshold is N−1 parameter thresholds, wherein N is an integer greater than or equal to 3 and the N−1 parameter thresholds form N parameter intervals;

the comparing the transmission parameter for the preamble with the at least one preset parameter threshold to obtain the comparison result and determining the ranking of the PRACH in the channel priorities according to the comparison result comprises:

comparing the transmission parameter with the N−1 parameter thresholds and determining the i-th parameter threshold interval to which the transmission parameter corresponds, wherein 1≤i≤N; and setting the ranking of the PRACH in the channel priorities to be the i-th, according to the i-th parameter threshold interval.

6. The method according to claim 1, wherein the controlling the transmit power for the plurality of uplink channels according to the channel priority comprises:

in a case where available transmit power is not enough for simultaneously transmitting the plurality of uplink channels, firstly using the available transmit power for an uplink channel with a highest ranking in the channel priorities according to rankings of the plurality of uplink channels in the channel priorities.

7. The method according to claim 1, wherein the plurality of uplink channels further comprises at least one of a physical uplink control channel (PUCCH), and a physical uplink shared channel (PUSCH); or the plurality of uplink channels further comprises a sounding reference signal (SRS).

8. A method of power control of an uplink channel, comprising:

receiving signaling transmitted from a base station, wherein the signaling is used for informing a user equipment (UE) of a channel priority of a physical random access channel (PRACH) preset by the base station, and the channel priority comprises a ranking of the PRACH in channel priorities; and controlling transmit power for a plurality of uplink channels according to the channel priority, in a case where the plurality of uplink channels need to be transmitted simultaneously, wherein the plurality of uplink channels comprise the PRACH.

9. The method according to claim 8, wherein the controlling the transmit power for the plurality of uplink channels according to the channel priority comprises:

in a case where available transmit power is not enough for simultaneously transmitting the plurality of uplink channels, firstly using the available transmit power for an uplink channel with a highest ranking in the channel priorities, according to rankings of the plurality of uplink channels in the channel priorities.

10. The method according to claim 8, wherein
the plurality of uplink channels further comprises at least one of a physical uplink control channel (PUCCH) and a physical uplink shared channel (PUSCH); or the plurality of uplink channels further comprises a sounding reference signal (SRS).

11. The method according to claim 8, after the receiving the signaling transmitted from the base station, further comprising:

acquiring a code in the signaling, wherein the code is used for indicating the channel priority; and determining the channel priority according to the code and a preset coding and decoding rule.

12. An apparatus for power control of an uplink channel, comprising:

a channel priority determining module, configured to compare a transmission parameter for a preamble with at least one preset parameter threshold to obtain a comparison result, and determine a channel priority of a physical random access channel (PRACH) according to the comparison result, wherein the channel priority comprises a ranking of a physical random access channel PRACH in channel priorities; and a first power controlling module, configured to control transmit power for a plurality of uplink channels according to the channel priority, in a case where the plurality of uplink channels need to be transmitted simultaneously, wherein the plurality of uplink channels comprise the PRACH.

13. The apparatus according to claim 12, wherein the at least one preset parameter threshold is one parameter threshold, and the channel priority determining module comprises:

a judging sub-module, configured to judge whether the transmission parameter is greater than the one parameter threshold; and a first ranking setting sub-module, configured to set the ranking of the PRACH in the channel priorities to be the highest in a case where the transmission parameter is greater than the one parameter threshold, and set the ranking of the PRACH in the channel priorities to be the lowest in a case where the transmission parameter is not greater than the one parameter threshold.

14. The apparatus according to claim 12, wherein the at least one preset parameter threshold is N−1 parameter thresholds, wherein N is an integer greater than or equal to 3 and the N−1 parameter thresholds form N parameter intervals, and the channel priority determining module comprises:

a parameter threshold interval determining sub-module, configured to compare the transmission parameter with the N−1 parameter thresholds and determine the i-th parameter threshold interval to which the transmission parameter corresponds, wherein 1≤i≤N; and a second ranking setting sub-module, configured to set the ranking of the PRACH in the channel priorities to be the i-th, according to the i-th parameter threshold interval.

15. The apparatus according claim 12, wherein in a case where available transmit power is not enough for simultaneously transmitting the plurality of uplink channels, the first power controlling module is configured to firstly use the available transmit power for an uplink channel with a highest ranking in the channel priorities, according to rankings of the plurality of uplink channels in the channel priorities.

16. An apparatus for power control of an uplink channel, comprising:

a signaling receiving module, configured to receive signaling transmitted from a base station, wherein the signaling is used for informing a user equipment (UE) of a channel priority of a physical random access channel (PRACH) preset by the base station, and the channel priority comprises a ranking of the PRACH in channel priorities; and a second power controlling module, configured to control transmit power for a plurality of uplink channels according to the channel priority, in a case where the plurality of uplink channels need to be transmitted simultaneously, wherein the plurality of uplink channels comprise the PRACH.

17. The apparatus according to claim 16, wherein in a case where available transmit power is not enough for simultaneously transmitting the plurality of uplink channels, the second power controlling module is configured to firstly use the available transmit power for an uplink channel with a highest ranking in the channel priorities, according to rankings of the plurality of uplink channels in the channel priorities.

18. The apparatus according to claim 16, further comprising:
  a code acquiring module, configured to acquire a code in the signaling, wherein the code is used for indicating the channel priority; and
  a decoding module, configured to determine the channel priority according to the code and a preset coding and decoding rule.

* * * * *